July 10, 1962 G. W. EBERHART 3,042,928
GOGGLES
Filed May 15, 1961

INVENTOR.
GERALD W. EBERHART
BY
*William J. Ruano*
his ATTORNEY

United States Patent Office 3,042,928
Patented July 10, 1962

3,042,928
GOGGLES
Gerald W. Eberhart, Reading, Pa., assignor to The Electric Storage Battery Company, Philadelphia, Pa.
Filed May 15, 1961, Ser. No. 110,152
1 Claim. (Cl. 2—14)

This invention relates to goggles of the cup type and, more particularly, to means for mounting the goggles on the head of the wearer to enable frequent and easy temporary removal and replacement during welding operations and the like.

An outstanding disadvantage of cup type goggles used for welding is that the elastic headband generally used for mounting the goggles on the head of the wearer requires frequent adjustment, also it disarranges the hair or disturbs the soft shop type cap when putting on and taking off the goggles during welding operation. Typical of such goggles are those shown in Hoffmaster Patent 2,667,640 and Matheson Patent 2,918,676, assigned to the present assignee.

An object of my invention is to provide a novel combination of cup goggles and supporting means in the form of temples which are so constructed and arranged as to overcome the above mentioned disadvantages of conventionally used cup goggles.

A more specific object of my invention is to provide cup goggles with pivotally mounted, inwardly bowed temples whose ends are curved upwardly so as to enable the wearer to raise the goggles so as to comfortably rest on his forehead when not needed and so as to be easily replaced to normal wearing position when welding is resumed.

A more specific object of my invention is to provide the combination of cup type goggles and temples of a construction so as to eliminate the necessity of adjusting the length of the headbands in conventional cup type goggles.

Other objects and advantages will become more apparent from a study of the following description taken with the accompanying drawing wherein.

Figure 1:
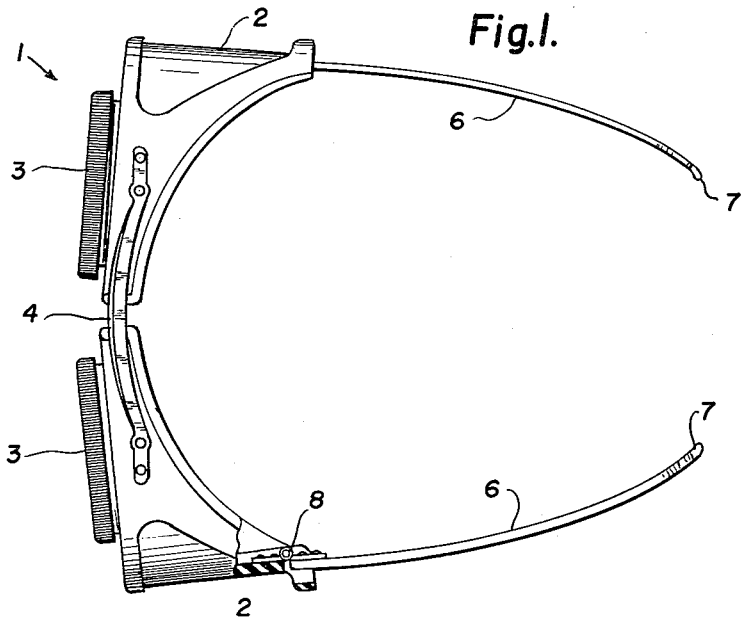
FIG. 1 is a top or plan view, with a portion shown broken away, of cup type goggles combined with temple means, embodying the principles of the present invention.
Figure 2:
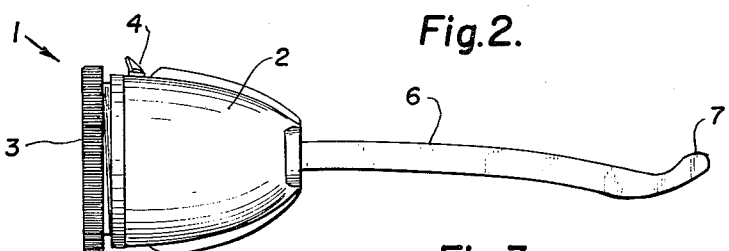
FIG. 2 is a side view of the goggles shown in FIG. 1.

Referring more particularly to the drawing, numeral 1 denotes a pair of cup type goggles for protecting the eyes during welding operations, and the like, comprising a pair of eye surrounding, side shields 2 on which are supported colored lenses 3 which are held in place by screw threaded rings 3, in a well known and conventional manner. The shields 2 are held together at their tops by a bowed leaf spring 4.

In place of conventional flexible headbands, a pair of temples 6 are provided of molded or sheet plastic material, preferably the same material from which the side shields 2 are molded, which temples are curved inwardly in a direction from front to rear and terminate in end portions 7 which are curved upwardly, rather than being curved downwardly in the conventional manner for temples used for ordinary protective eyeglasses, as distinguished from cup type goggles.

Figure 3:
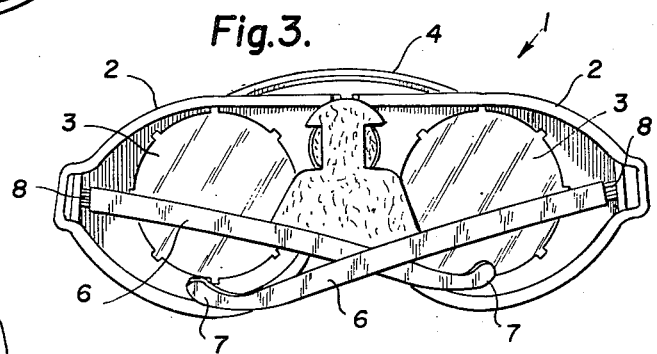
FIG. 3 is a rear view of the goggles shown in FIG. 1 illustrating the temples in folded position.

The temples 6 are pivotally mounted at their forward ends by hinges 8 whereby the temples 6 may be pivoted and folded in the manner shown in FIG. 3 so that the end portions thereof are slightly sprung so as to be retained within the confines of the shields 2 and frictionally held therein by virtue of contact with the bottom portions of the inner surfaces of the side shields 2.

By virtue of the above mentioned construction of the temples, there is no need for adjusting the length of the headband as is necessary in conventional goggles since the temples 6 will fit varying head sizes. And most important, when the wearer wishes to temporarily remove the goggles, for example, between welding operations, he merely lifts the side shields 2 to the position shown in FIG. 4, whereupon the goggles rest comfortably on the forehead of the wearer without discomfort. It should be particularly noted that the upward curvature of end portions 7 of the temples provides an amazingly higher degree of comfort than would be provided by temples whose end portions were curved downwardly, instead, in the usual way. This greater comfort is particularly noticed when the temples are slipped onto the head and the ends thereof are sprung and slid along the temples of the wearer, since the upward curvature prevents the uncomfortable pressure of the pointed extreme ends against the temples of the head as would occur when the end portions 7 are pointed downwardly instead. In other words, in the construction shown, it is not the extreme ends but the upwardly curved portion before the extreme ends which engage the temples of the wearer and which do not dig into the head of the wearer as do the extreme ends, particularly when the temples are appreciably sprung apart so as to partially straighten out.

Figure 4:
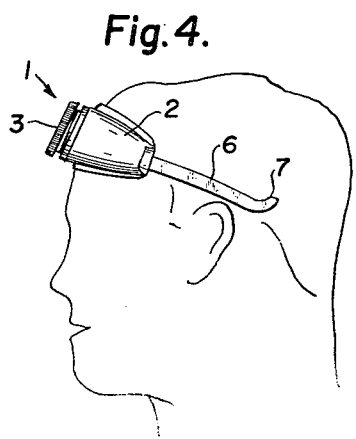
FIG. 4 is a side elevational view showing how the goggles are supported on the forehead as a consequence of the temple construction when the goggles are not being used.

And even when the goggles are in the position shown in FIG. 4, the upward curvature of end portions 7, for the reasons pointed out above, provides a more comfortable fit with the bony portion of the head directly behind the upper portions of the ears.

Thus it will be seen that I have provided an efficient pair of goggles of the cup type wherein specially constructed temples are used in combination with the goggles to provide a means for supporting the goggles on the forehead when not in use so as to provide maximum comfort of wear by virtue of the particular shape of the temple, and which eliminates the discomfort and hair messing tendency of headbands which are conventionally used with this type of goggles.

Furthermore, I have provided a more sanitary and durable goggle construction that does not collect dirt and filth and tend to decompose rapidly upon exposure to hair oil and shop grease as does an elastic or rubber headband.

While I have illustrated and described a single specific embodiment of my invention, it will be understood that this is by way of illustration only, and that various changes and modifications may be made within the contemplation of my invention and within the scope of the following claim.

I claim:

In a pair of goggles of the cup type having shields surrounding the eyes of the wearer containing a pair of lenses mounted forwardly of the shields and an adjustable member for holding together said shields, in combination, a pair of temples pivotally mounted to the extremities of said shields and foldable so as to be completely contained within said shields, said temples being curved inwardly from front to rear and having substantially straight portions terminating in end portions which are curved upwardly from the straight portions, whereby the goggles may be tilted upwardly and comfortably rested on the forehead of the wearer without having the extreme end portions of the temples dig into the temples of the wearer.

References Cited in the file of this patent

UNITED STATES PATENTS

| | | |
|---|---|---|
| 1,665,940 | Sweeney | Apr. 10, 1928 |
| 2,407,518 | Schauweker | Sept. 10, 1946 |